(12) United States Patent
Ito

(10) Patent No.: US 10,384,615 B2
(45) Date of Patent: Aug. 20, 2019

(54) FOLDABLE HOLDING DEVICE

(71) Applicant: Yuzuru Ito, Plymouth, MI (US)

(72) Inventor: Yuzuru Ito, Plymouth, MI (US)

( * ) Notice: Subject to any disclaimer, the term of this patent is extended or adjusted under 35 U.S.C. 154(b) by 108 days.

(21) Appl. No.: 15/627,860

(22) Filed: Jun. 20, 2017

(65) Prior Publication Data

US 2017/0361774 A1 Dec. 21, 2017

Related U.S. Application Data

(60) Provisional application No. 62/353,023, filed on Jun. 21, 2016, provisional application No. 62/383,547, filed on Sep. 5, 2016.

(51) Int. Cl.
*B60R 5/04* (2006.01)
*B60R 7/02* (2006.01)

(52) U.S. Cl.
CPC . *B60R 5/04* (2013.01); *B60R 7/02* (2013.01)

(58) Field of Classification Search
CPC ..... B60R 7/02; B60R 5/04; B60R 2011/0029; B65D 11/186
USPC .................................. 224/539, 542
See application file for complete search history.

(56) References Cited

U.S. PATENT DOCUMENTS

| | | | |
|---|---|---|---|
| 4,091,852 A | 5/1978 | Jordan et al. | |
| 4,718,584 A * | 1/1988 | Schoeny | B60R 7/02 217/12 R |
| 4,781,300 A * | 11/1988 | Long | B65D 11/1833 220/6 |
| 4,871,100 A * | 10/1989 | Posner | B62B 3/1464 224/411 |
| 5,472,107 A * | 12/1995 | Lieber | B65D 1/225 220/6 |
| 5,918,798 A * | 7/1999 | Frahm | B65D 5/3614 229/117.07 |
| 6,015,071 A * | 1/2000 | Adomeit | B60R 7/02 220/6 |
| 6,056,177 A * | 5/2000 | Schneider | B60R 5/04 220/4.28 |
| 6,254,162 B1 * | 7/2001 | Faber | B60P 7/0892 224/497 |
| 6,290,277 B1 | 9/2001 | Spykerman et al. | |
| 6,308,873 B1 | 10/2001 | Baldas et al. | |

(Continued)

FOREIGN PATENT DOCUMENTS

DE 10108338 A1 8/2002
DE 10110335 A1 9/2002
(Continued)

*Primary Examiner* — Justin M Larson
(74) *Attorney, Agent, or Firm* — Harness, Dickey & Pierce, P.L.C.

(57) ABSTRACT

A foldable holding device that is provided in or on a floorboard, the foldable holding device including: a housing member; raisable top panels that fits into the housing member while the raisable top panels are housed; side panels foldably connected to side edges of the raisable top panels such that as the raisable top panels are raised, the side panels outwardly moves to form the foldable holding device in a reversed truncated quadrangular pyramid shape. The foldable holding device fixed to the floorboard so that the foldable holding device and floorboard configure a single member. Alternatively, the foldable holding device is detachable to the floorboard.

29 Claims, 26 Drawing Sheets

(56) References Cited

U.S. PATENT DOCUMENTS

| | | | |
|---|---|---|---|
| 6,588,652 B2 * | 7/2003 | Cai | B65D 5/2047 |
| | | | 229/117.07 |
| 7,201,421 B2 | 4/2007 | Reynolds et al. | |
| 8,215,693 B2 | 7/2012 | Ulita | |
| 8,651,309 B2 * | 2/2014 | Gualersi | B65D 11/1833 |
| | | | 220/4.28 |
| 8,789,715 B2 | 7/2014 | Shea et al. | |
| 9,381,865 B2 * | 7/2016 | Kmita | B60R 5/04 |
| 9,623,804 B2 * | 4/2017 | Warnecke | B60R 13/013 |
| 9,932,143 B2 * | 4/2018 | Henderson | B65D 11/1833 |
| 10,106,090 B2 * | 10/2018 | Ito | B60R 7/02 |
| 2005/0087530 A1 * | 4/2005 | Svenson | B60R 7/02 |
| | | | 220/6 |
| 2015/0175080 A1 | 6/2015 | Kmita et al. | |
| 2016/0229347 A1 | 8/2016 | Warnecke | |
| 2017/0129410 A1 * | 5/2017 | Ito | B60R 7/02 |

FOREIGN PATENT DOCUMENTS

| | | |
|---|---|---|
| DE | 10-2012-004183 A1 | 9/2013 |
| EP | 0983902 A2 | 3/2000 |
| JP | S60-052139 U | 4/1985 |

\* cited by examiner

FOLDABLE HOLDING DEVICE

CROSS-REFERENCE TO RELATED APPLICATION

This application claims priority to Provisional Patent Application No. 62/353,023 filed Jun. 21, 2016, and 62/383,547 filed Sep. 5, 2016 which are hereby expressly incorporated by reference herein in their entirety.

BACKGROUND

The present invention relates to a foldable holding device in or on a floorboard used in a trunk or luggage compartment of a vehicle.

Conventionally, for example, as in Japanese Utility Model Publication No. S60-52139, in regards to a foldable holding device being used in a trunk or a luggage compartment of an automobile, the foldable holding device is known. A rectangular hole is cut out in a carpet body. The foldable holding device is configured by a box-shaped container that is formed by connecting both side edges of compartment walls fitted in a locations facing that hole by a flexible material.

However, the conventional foldable holding device uses the flexible material. Although it is convenient for folding and suitable for storage, its strength is poor when the box-shaped container is formed by raising the compartment walls. Therefore, there is a problem in which luggage or goods cannot be sufficiently held because a load of luggage is imposed such as at acceleration, deceleration and direction changes of a vehicle.

On the other hand, when the flexible material parts are also composed of the compartment walls, the adjacent compartment walls must be fastened to each other with hooks or the like in order to make the four sides of the compartment walls maintain a raised position (a raised state). As a result, it becomes bothersome to assemble the compartment walls into a container shape (the foldable holding device).

Further, although there is also another method of storing the luggage or goods by stretching a net in a trunk or a luggage compartment of an automobile, there is a problem in which it becomes difficult to load and unload the luggage or goods, and its capacity is small.

SUMMARY

The present invention attempts to solve these problems. An object of the present invention is to provide a holding device that is easily raisable so as to be in a container-shaped state and the container-shaped state can certainly be maintained.

In order to achieve the above object, one aspect of the present invention is directed to a foldable holding device that is provided in a floorboard of a luggage compartment, the foldable holding device including: a housing member that is provided in the floorboard; a raisable pair of top panels that nests within the housing member in a housed state, each of the raisable pair of top panels having an upper edge, a lower edge and side edges, the raisable pair of top panels stand when the raisable pair of top panels are outwardly opened from the upper edges of the raisable pair of top panels; and a pair of side panels foldably connected to the side edges of each of the raisable pair top panels, the pair of side panels being configured to outwardly move as the raisable pair of top panels are raised and to form, together with the raisable pair of top panels, an open state of the foldable holding device in a reversed truncated quadrangular pyramid shape. The foldable holding device is fixed to the floorboard so that the foldable holding device and floorboard configure a single member. Each of the pair of side panels is configured with: a first pair of triangular side panels that are generally triangularly or trapezoidally shaped, a first side edge of each of the first pair of triangular side panels being foldably connected to one of the side edges of each of the raisable pair of top panels, respectively; and a second triangular side panel that is generally triangularly or trapezoidally shaped, two side edges of the second triangular side panel being respectively and foldably connected to two of second side edges of the first pair of triangular side panels, and a lower edge of the second triangular side panel forms a lower edge of each of the pair of side panels. Further, a length of the upper edge of each of the raisable pair of top panels is longer than a length of the lower edge of each of the raisable pair of top panels.

In the foldable holding device, a total length of a sum of upper edges of each of the first pair of triangular side panels and an upper edge of the second triangular side panel is longer than the lower edge of each of the pair of side panels. In other words, as shown in FIGS. 2, 4, 7, 8, 17, 22, 25, 26 and 30-32, a top area of the reversed truncated quadrangular pyramid shape in the open state formed by the upper edges of the raisable pair of top panels and the upper edges of the pair of side panels is larger than a bottom area of the reversed truncated quadrangular pyramid shape in the open state formed by the lower edges of the raisable pair of top panels and lower edges of the pair of side panels. Further, the raisable pair of top panels and the pair of side panels are outwardly inclined in the open state in a plan view.

According to the configuration explained above, in the raised state of the holding device, at least one upper edge of a pair of side panels or a pair of top panels is longer than its lower edge and inclines so as to upwardly expand. Therefore, a container-shaped state can be easily maintained by the weights of the pair of the side panels and the pair of the top panels themselves. Further, when the luggage is stored inside the holding device, even when the luggage is moved therein, the pair of side panels and the pair of the top panels hardly fall down. Further, a shape "a reversed truncated quadrangular pyramid" has a shape in which a truncated quadrangular pyramid is inverted or reversed, and that shape means a container-shaped state in which it upwardly expands gradually and opens at a top thereof. Because of this reversed truncated quadrangular pyramid, an internal capacity can be increased as compared with a rectangular parallelepiped. It is preferred that the upper edges are longer than the lower edges at both top panels and the side panels. However, even when the upper edges of only either the top panels or the side panels are longer than their lower edges, it is effective.

Another aspect of the present invention is directed to a foldable holding device that can be provided on a floorboard so that the foldable holding device is detachable to the floorboard. The foldable holding device has other features described in the above one aspect except this detachable feature.

According to the configuration explained above with respect to another aspect, when the holding device (body) is configured to be attachable and detachable to a floorboard, the holding device can be removed when not necessary. Further, it is convenient because it can be attached to an arbitrary place on the floorboard when needed. On the other hand, when the holding device body is integrally configured to the floorboard as the above one aspect, it is easy to secure more rigidity.

DESCRIPTION OF EXEMPLARY EMBODIMENTS

Embodiments of the present invention will be explained below with reference to the drawings.

First Embodiment

Figure 1:
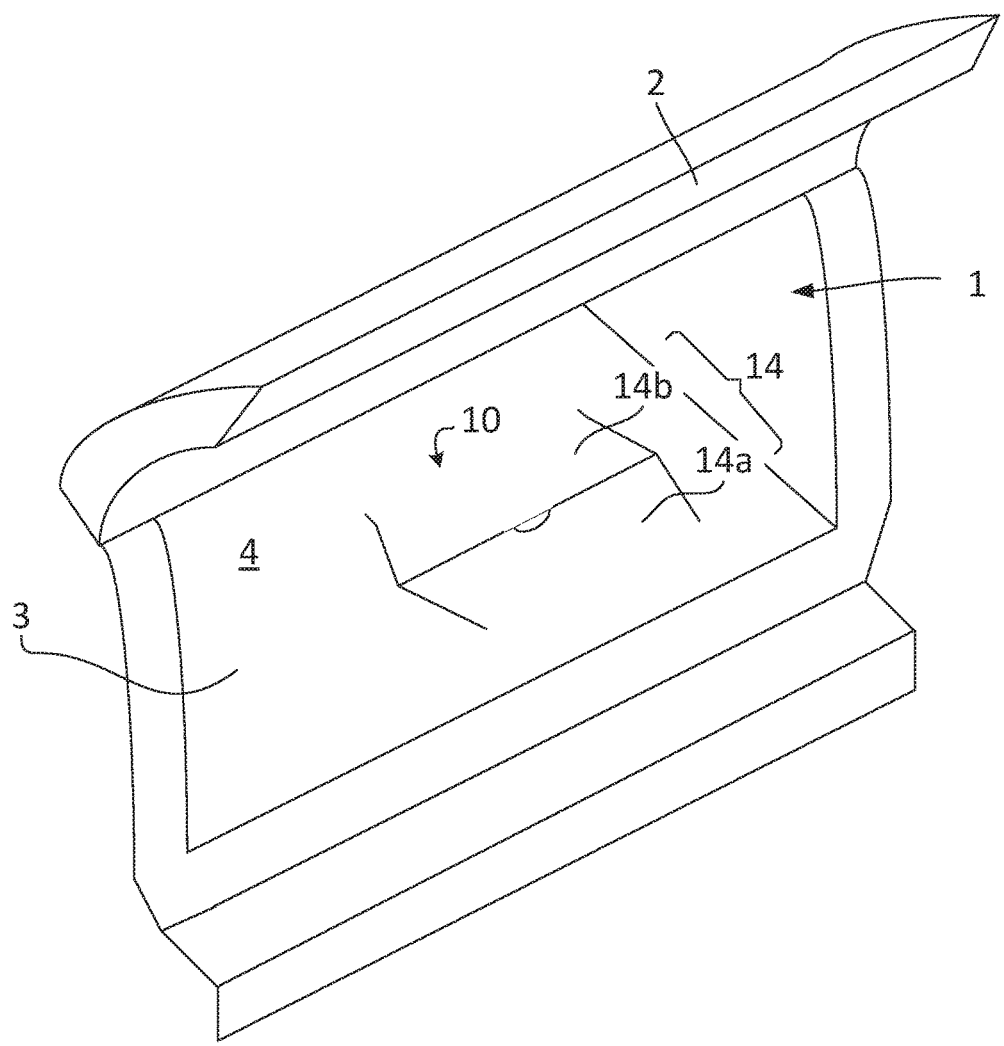
FIG. 1 is a perspective view that shows a luggage compartment in which a floorboard having a holding device housed in the floorboard in a folded state is provided according to a first embodiment of the present invention.
Figure 2:
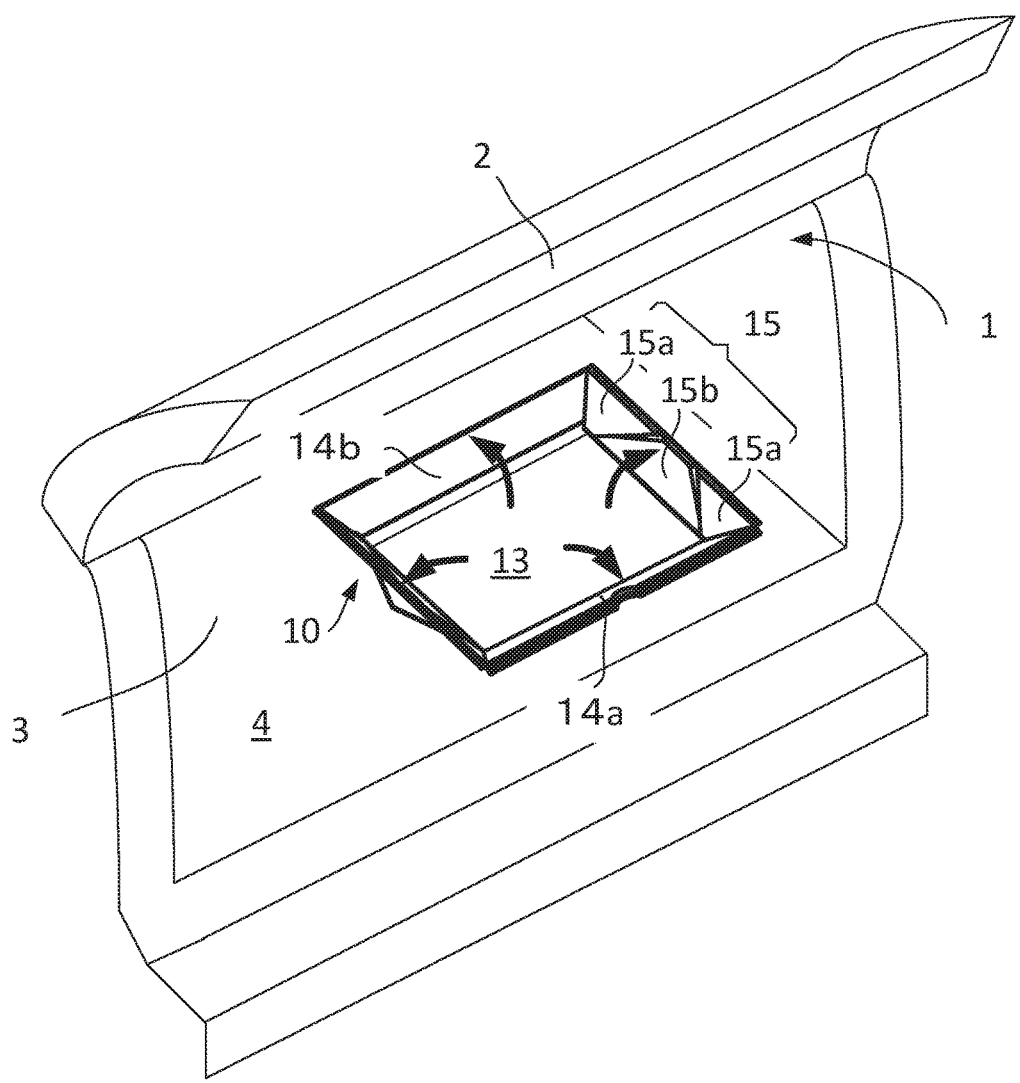
FIG. 2 is a perspective view that shows the luggage compartment in which the floorboard having the holding device raised in the floorboard in a raised state is provided according to the first embodiment of the present invention.

FIG. 1 shows a luggage compartment 1 in which a floorboard 4 having a holding device 10 in a folded state is provided in according with a first embodiment of the present invention. FIG. 2 corresponds to FIG. 1 in which the holding device 10 is in a raised state to become a shape of a reversed truncated quadrangular pyramid. For example, the floorboard 4 is mounted so as to be attachable and detachable to a floor 3 when a trunk lid 2 of the automobile luggage compartment 1 is opened. Though an illustration is omitted from the drawings, by lifting the floorboard 4, it is possible to remove a spare tire housed in the floor 3 which is made, for example, of metal. Furthermore, the floorboard 4 can be made so that it can be attachable and detachable, or can also be fixed to the floor 3. In regards to the automobile, it is not limited such as a sedan, SUV, station wagon, or a mini-van.

Figure 5:
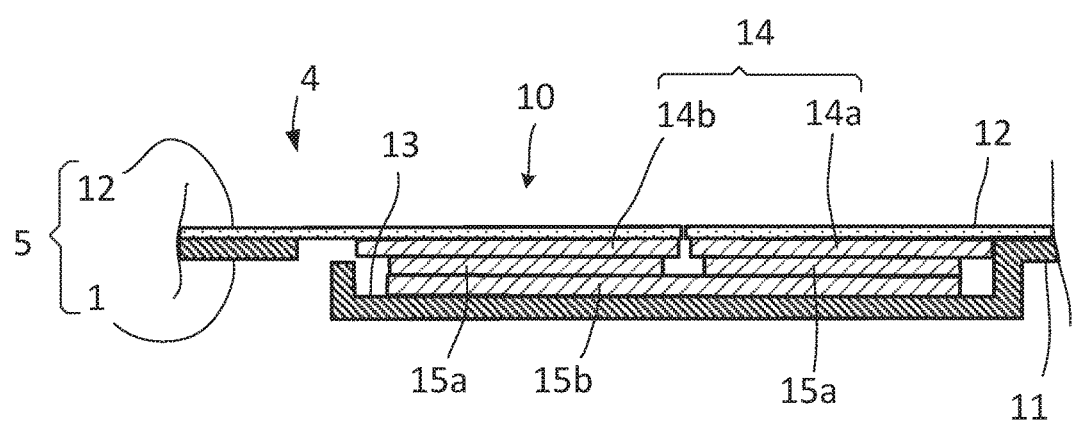
FIG. 5 is a cross section view that shows the folded state along the V-V line shown in FIG. 3.

As shown in FIG. 5, for example, the floorboard 4 is a floorboard body 5 that is configured with a core material 11 being made from such as a molded resin component and a carpet material 12 that is attached to the core material 11. For example, the carpet material 12 is attached to the core material 11 with such as an adhesive.

The core material 11 is, for example, composed of a member that has relatively a high rigidity and a light-weight such as a resin molding product in which a thickness is about 12 mm, and that is substantially tabular which can be fitted into the luggage compartment 1. At its back edge, for example, a housing member (recess) 13 is formed in the core material 11 recessed one step below the other areas thereof. The housing member (recess) 13 is, for example, a rectangular shape in a plan view and can also be a square. At an inner bottom of the housing member (recess) 13, the core material 11 can be exposed and can also be covered by the cloth material such as the carpet material 12 so that luggage protection and a noise control can be secured.

Figure 3:
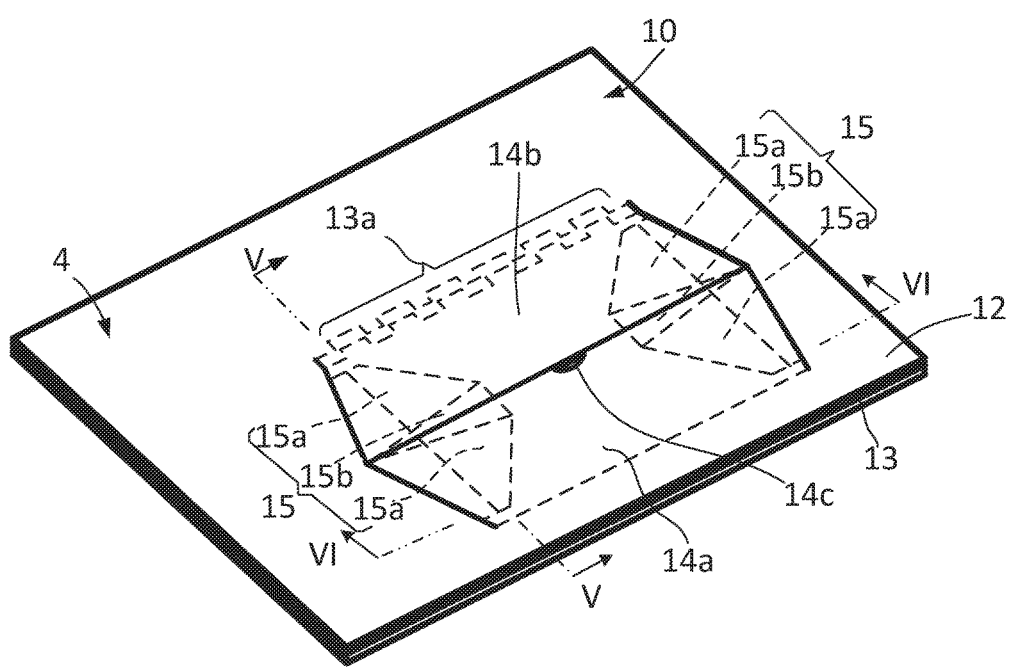
FIG. 3 is an enlarged perspective view that shows the holding device in the folded state.
Figure 6:
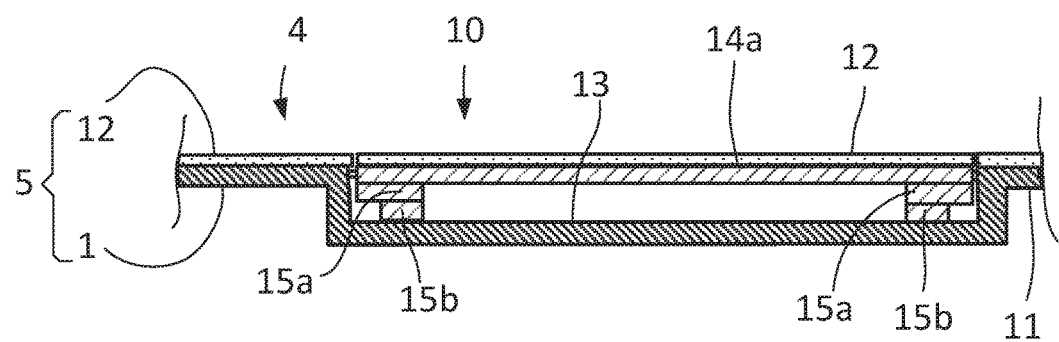
FIG. 6 is a cross section view that shows the folded state along the VI-VI line shown in FIG. 3.

The floorboard 4 has the holding device 10 which can be folded into the housing member (recess) 13. Specifically, as shown in FIGS. 3, 5, and 6, the housing member (recess) 13 is normally covered by a top panel (top panels) 14 that can be raised and has the shape of a substantially rectangular flat panel. In the present embodiment, the top panels 14 are respectively movably supported centering on a pair of facing edges (corresponding to a front edge and a rear edge of the housing member (recess) 13) and is configured with a first top panel 14a and a second top panel 14b that can be raised. The first top panel 14a and the second top panel 14b has, for example, a rigid core material that is the same material as the core material 11, and a surface side of this rigid core material is covered by the carpet material 12. Further, the flat top panel 14 is formed with the holding device 10 in the folded state. Because the surface of the top panels 14 is covered with the carpet material 12 that is the same as the surrounding area, it presents an attractive appearance. Further, as long as being a flexible raw material, the carpet material 12 can also be other flexible fabric components without being limited. Further, on an upper edge of the first top panel 14a, for example, a finger-hold point 14c, cut out in an arc-like shape, is provided to enable a finger to be inserted.

Further, as shown in FIG. 3 with broken lines, a cushion gap 13a, which is in a form in which a projection and a recess are alternately arranged (a plurality of legs), is formed between a lower edge of the second top panel 14b and a housing side of the housing member (recess) 13. Further, a configuration of the cushion gap 13a between the second top panel 14b and the housing member (recess) 13 has a zigzag shape in a plan view so as to not extend linearly. As a result, the carpet material 12 is prevented from downwardly sinking into the gap 13a when the holding device 10 is in a folded state. However, an interval of the zigzag shape is not limited.

A pair of side panels 15 is foldably connected to both ends of the first top panel 14a and the second top panel 14b. The pair of the side panels 15 is formed, for example, of a rigid material that is the same as the top panels 14, and is integrally connected to the top panels 14 by flexible hinges 16. The flexible hinges 16 are made by thinning the rigid material. When the pair of the side panels 15 are also covered by the carpet material 12, the hinges 16 can also be covered by the carpet material 12 or cannot be covered by the carpet material 12.

Each of the pair of side panels 15 has a pair of first triangular side panels 15a that are generally triangular or trapezoidally shaped. Specifically, each edge of the first triangular side panels 15a is respectively and foldably attached to side edges of the first top panel 14a and the second top panel 14b. In the present embodiment, although the first triangular side panel 15a is configured with a flat panel of a substantially triangle shape, as shown in the drawings, it can also be a trapezoidal shape in which a tip corner is cut off. A second triangular side panel 15b is foldably connected to each sloped edge of the pair of the first triangular side panels 15a. The second triangular side panel 15b is, for example, has a substantially isosceles triangle with its tip flattened. A lower edge of the second triangular side panel 15b corresponds to a lower edge of the side panel 15 in the raised position. The second triangular side panel 15b can also be generally triangularly or trapezoidally shaped. The same configuration is applied to the other side panels in the embodiments of this application.

Figure 4:
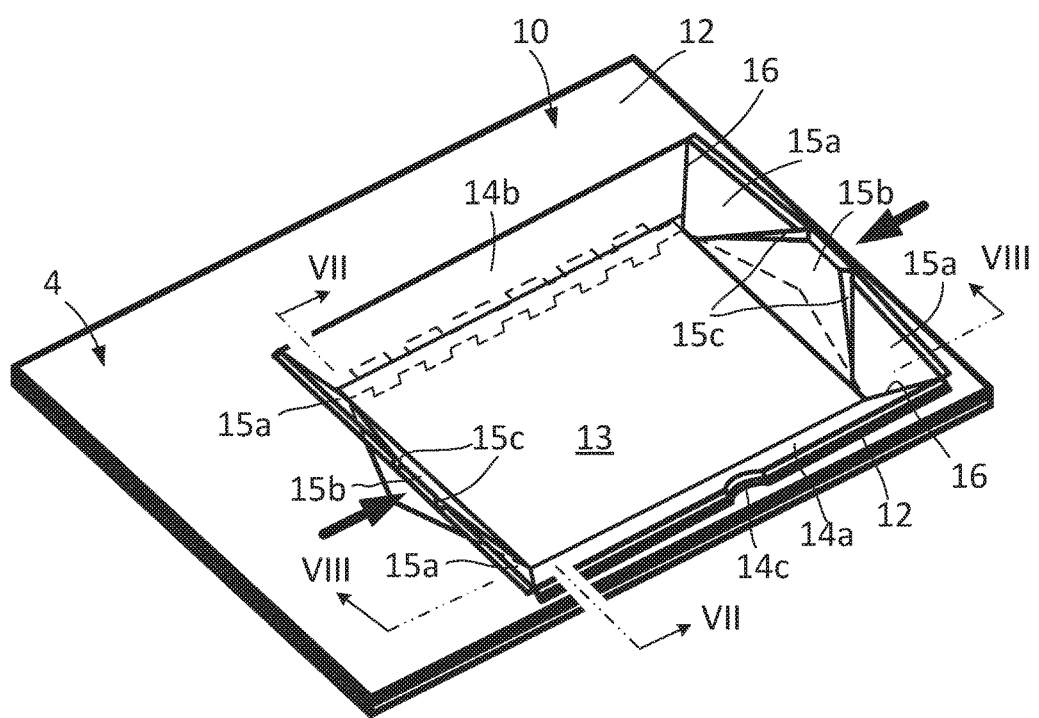
FIG. 4 is an enlarged perspective view that shows the holding device in the raised state.

As shown in FIG. 4, at mating faces (locations where the hinges 16 are provided) between the first triangular side panels 15a and the second triangular side panel 15b explained above, a chamfer 15c for preventing a finger from pinching is provided. The chamfer 15c can be provided at an upper part in which at least a finger can reach at the mating faces between the first triangular side panels 15a and the second triangular side panel 15b. As a result, the finger pinch during a standing (raising) position operation can be effectively prevented. On the other hand, because the chamfer 15c is not provided at a lower end side of the mating faces, a raised state of the side panel 15 can be maintained. The part in which the chamfer 15c is not provided can also be located at middle parts of the mating faces.

Figure 7:
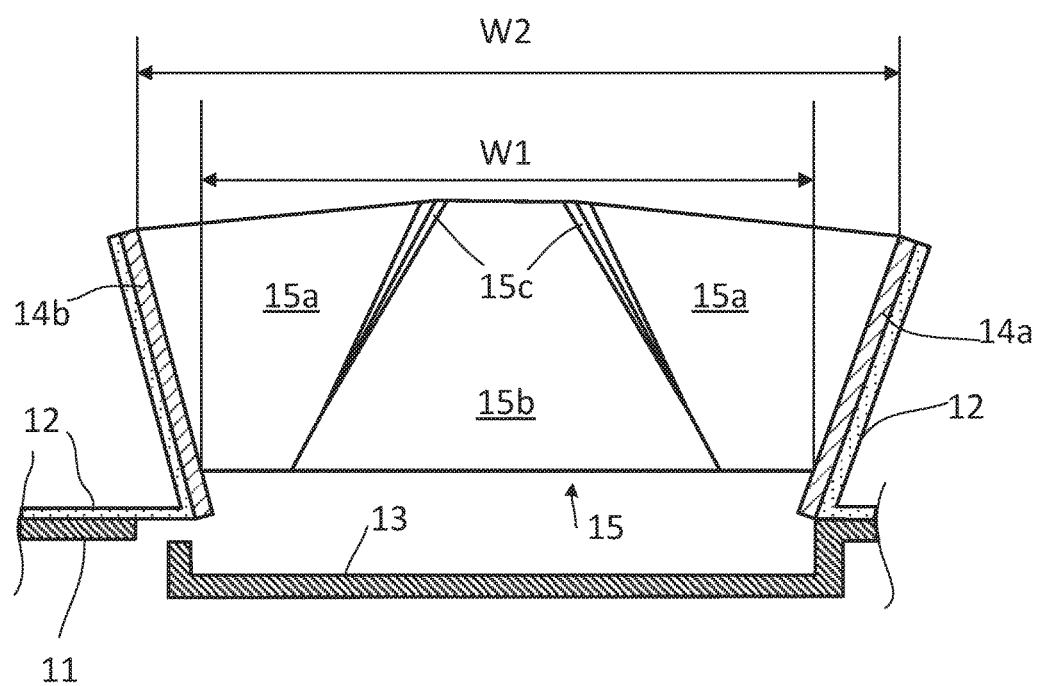
FIG. 7 is a cross section view that shows the raised state along the VII-VII line shown in FIG. 4.
Figure 8:
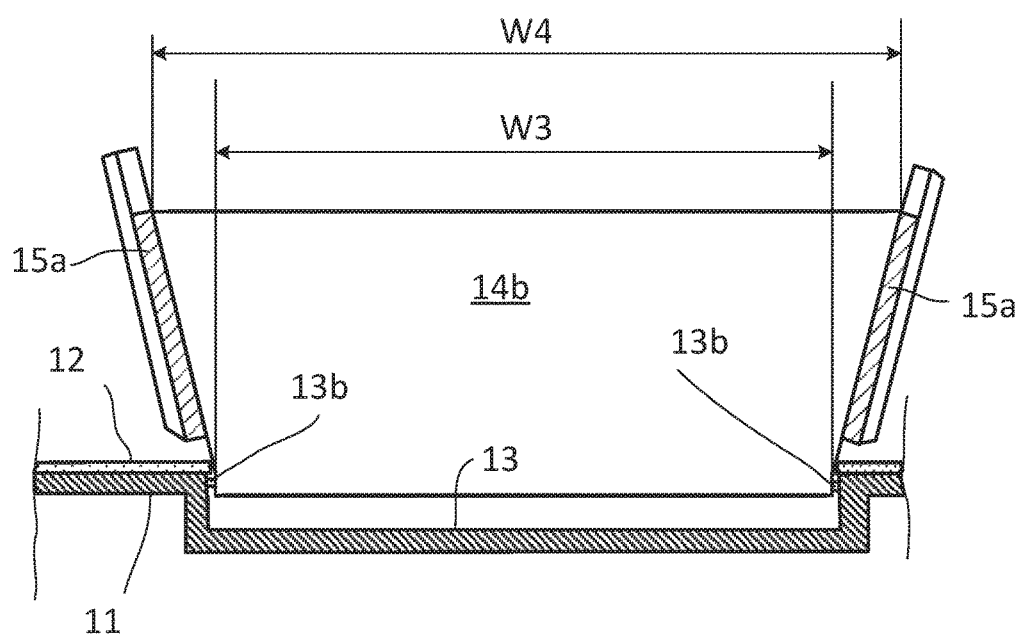
FIG. 8 is a cross section view that shows the raised state along the VIII-VIII line shown in FIG. 4.
Figure 9:
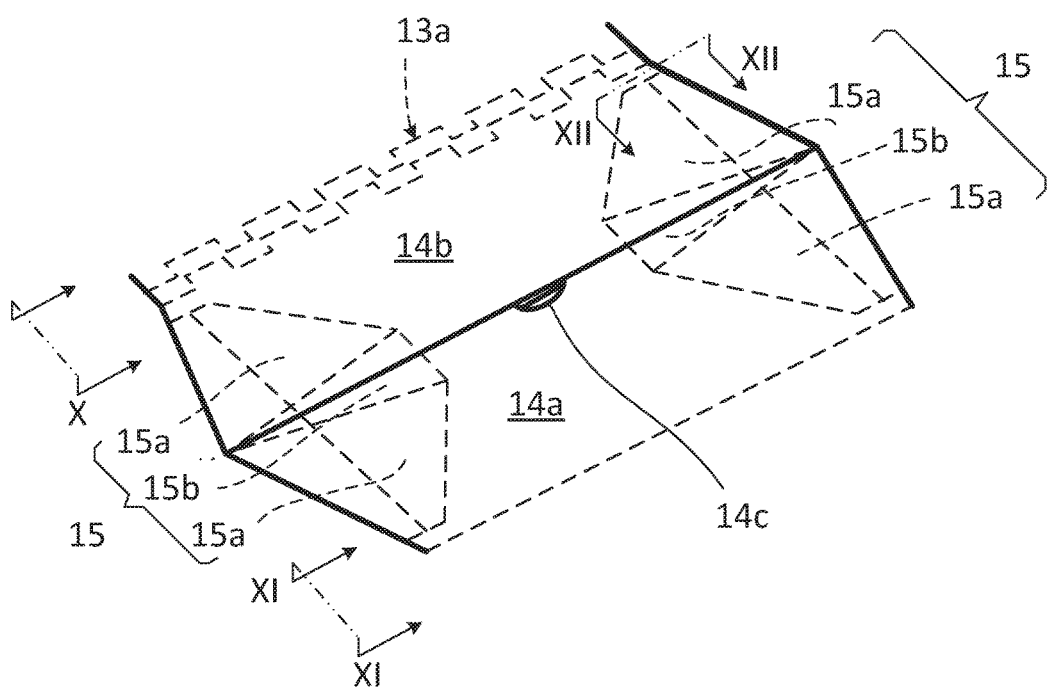
FIG. 9 is an enlarged perspective view that shows the holding device in the folded state.

When the first top panel 14a and the second top panel 14b are raised, the pair of the side panels 15 is also raised at positions mutually opposed to each other and forms the holding device 10 that has the reversed truncated quadrangular pyramid shape together with the top panels 14. Specifically, as shown in FIG. 7, a width W2 of the upper edge is longer than a width W1 of the lower edge of the pair of the side panels 15 in the raised position (W2>W1). Further, as shown in FIG. 8, a width W4 of the upper edge is longer than a width W3 of the lower edge of the first top panel 14a and the second top panel 14b in the raised position (W4>W3). As a result, the holding device 10 has the reversed truncated quadrangular pyramid shape in the raised position. In other words, as shown in FIGS. 7 and 8, a top area of the reversed truncated quadrangular pyramid shape in the open state formed by the upper edges of the raisable pair of top panels 14 and upper edges of the pair of side panels 15 is larger than a bottom area of the reversed truncated quadrangular pyramid shape in the open state formed by the lower edges of the raisable pair of top panels 14 and lower edges of the pair of side panels 15. Further, the raisable pair of top panels 14 and the pair of side panels 15 are outwardly inclined in the open state in a plan view.

Figure 10:
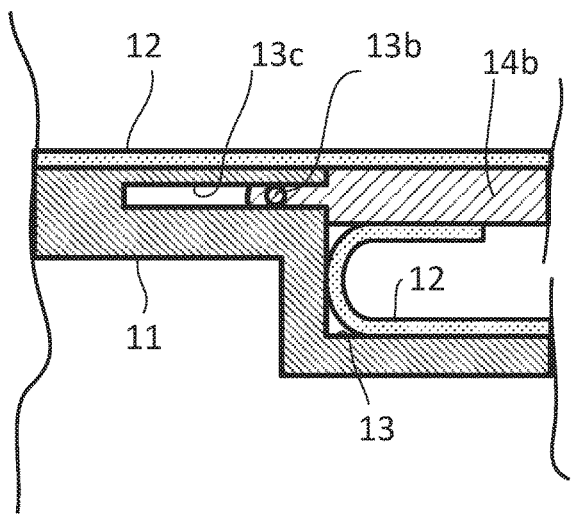
FIG. 10 is a cross section view that shows the folded state along the X-X line shown in FIG. 9.
Figure 11:
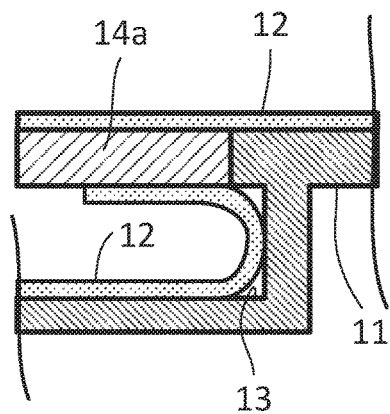
FIG. 11 is a cross section view that shows the folded state along the XI-XI line shown in FIG. 9.
Figure 12:
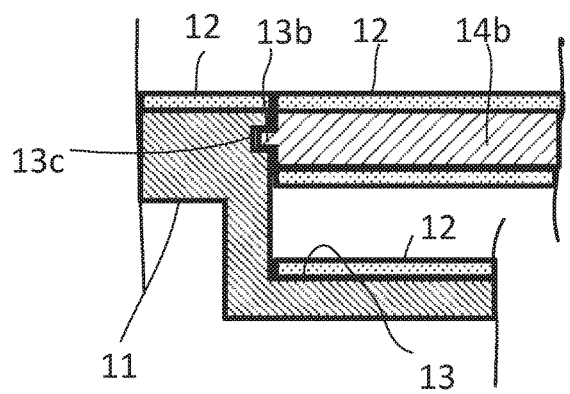
FIG. 12 is a cross section view that shows the folded state along the XII-XII line shown in FIG. 9.
Figure 14:
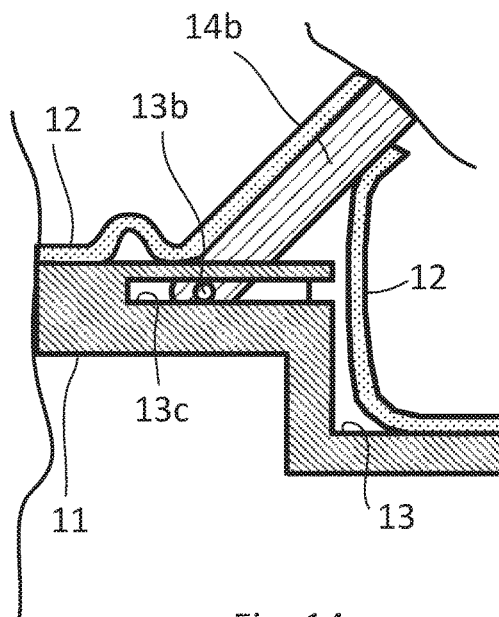
FIG. 14 is a cross section view that shows the half-raised state along the XIV-XIV line shown in FIG. 13.
Figure 15:
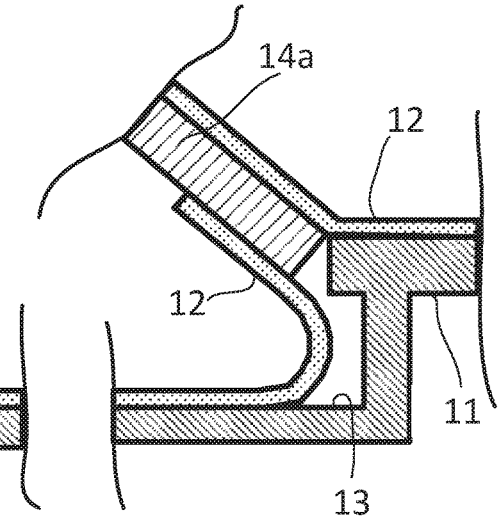
FIG. 15 is a cross section view that shows the half-raised state along the XV-XV line shown in FIG. 13.
Figure 18:
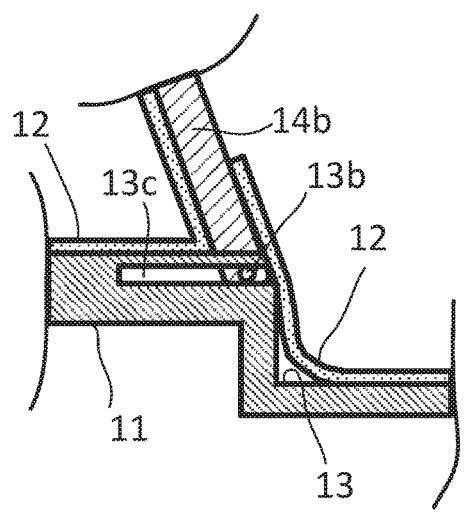
FIG. 18 is a cross section view that shows the raised state along the XVIII-XVIII line shown in FIG. 17.
Figure 19:
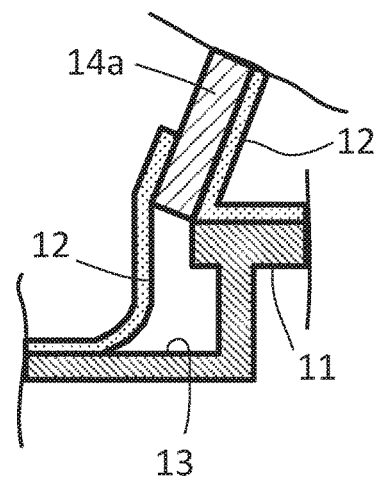
FIG. 19 is a cross section view that shows the raised state along the XIX-XIX line shown in FIG. 17.

As shown in such as FIGS. 10 and 12, for instance, support pins (support projections) 13b are formed on the right and left side surfaces of a base end (a lower edge) of the second top panel 14b. Specifically, the support pins 13b substantially horizontally project from the right and left sides of the base end of the second top panel 14b as a support shaft. Further, support grooves (guide groove) 13c into which the support pins 13b fitted are formed at the corresponding side surfaces of the housing member (recess) 13. As a result, as shown in FIGS. 10-20 in order, the support pin 13b is slid and moved in the support groove 13c so that the second top panel 14b rotates around this support pin 13b as a rotation axis. As a result, because the opening/closing (raising/folding or standing/housing) operations of the second top panel 14b become particularly stable, the opening/closing operations of the overall holding device 10 also become smooth. On the other hand, as shown in FIGS. 11, 15, and 19, the first top panel 14a is foldably supported at a peripheral edge of the housing member (recess) 13 via the carpet material 12 (or it can be supported by other method).

Next, the use procedure for the floorboard 4 having the foldable holding device 10 according to the present embodiment will be explained.

In the housed position shown in FIGS. 1 and 3, the pair of the side panels 15 is positioned under the top panel 14 as shown in FIGS. 5 and 6, and is held down by the weight of the top panel 14 so that a flat state is maintained. The surface of the top panel 14 is covered with the carpet material 12. Because the surface is approximately at the same height as the surrounding surfaces, it presents an attractive appearance. In addition, when the luggage or goods are loaded or unloaded in the compartment 1, the luggage or goods is difficult to be caught. Further, because the thickness of the floorboard 4 can be kept as thin as possible, it is benefit for vehicle designs. As shown in FIGS. 10 and 12, the support pins 13b are located at a vehicle rear side (the side of the housing member (recess) 13) of the support groove 13c.

Figure 13:
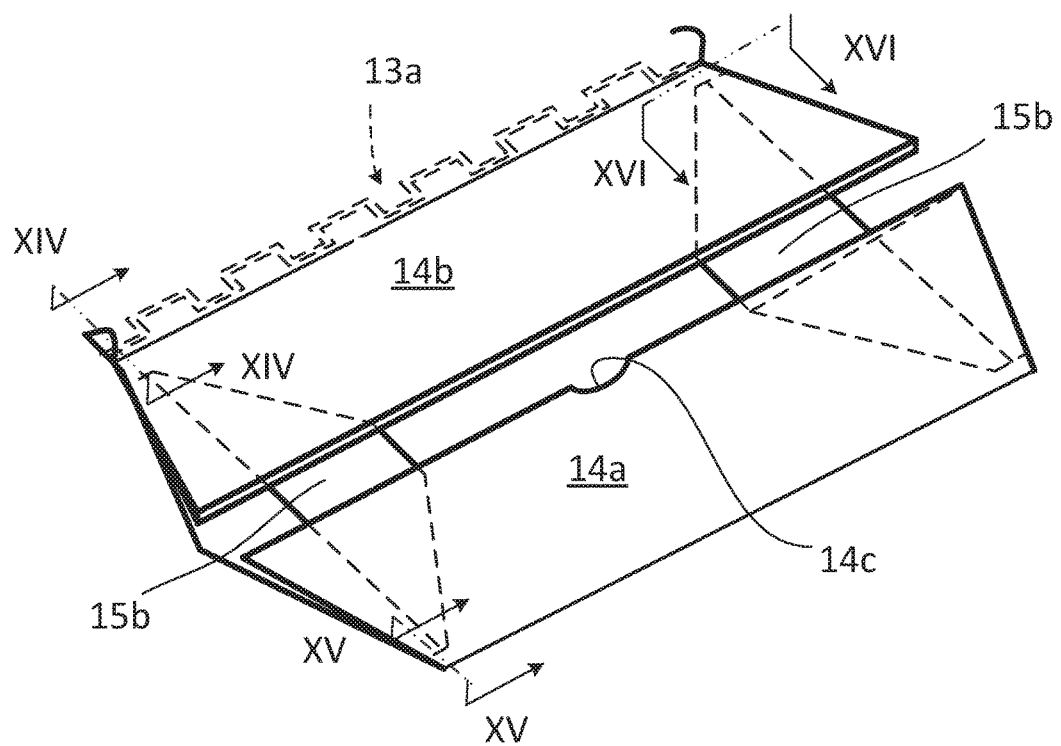
FIG. 13 is an enlarged perspective view that shows the holding device while being raised (a half-raised state).
Figure 16:
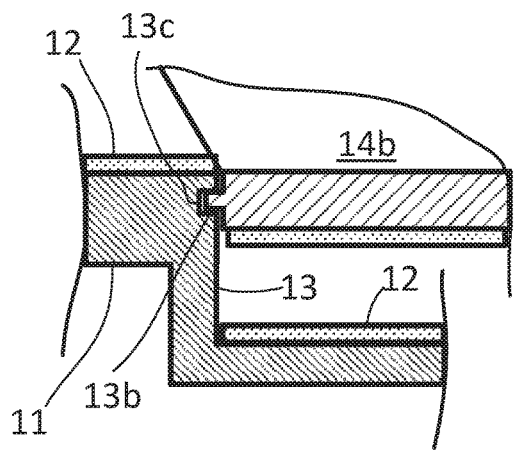
FIG. 16 is a cross section view that shows the half-raised state along the XVI-XVI line shown in FIG. 13.
Figure 17:
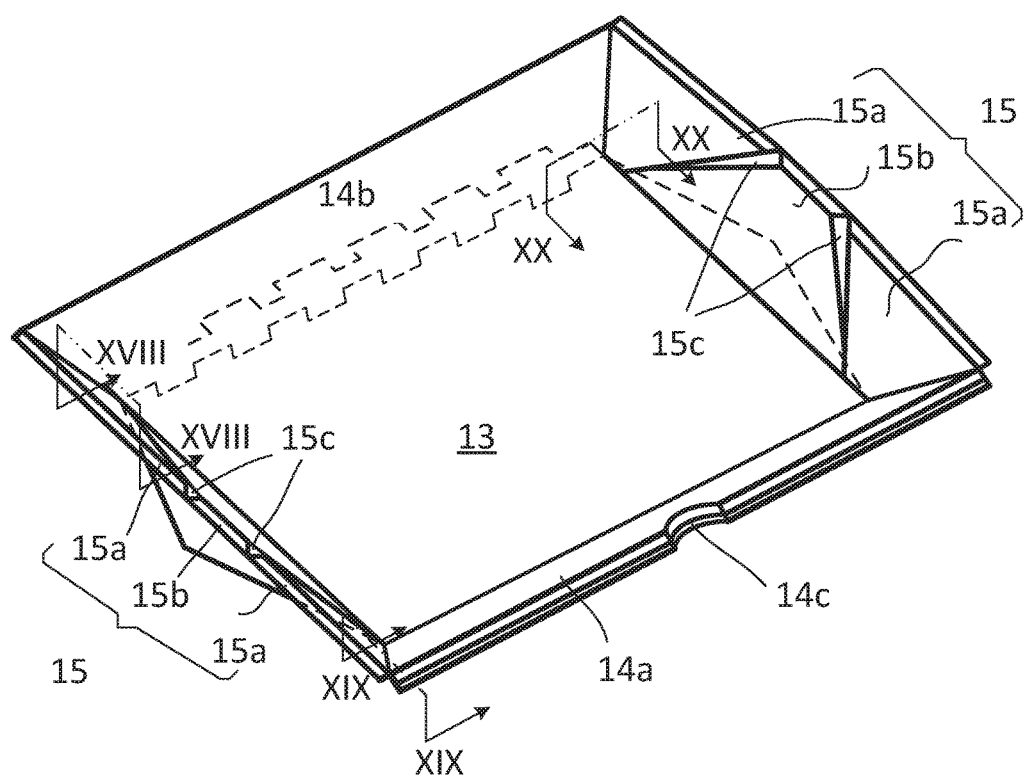
FIG. 17 is an enlarged perspective view that shows the holding device in the raised state.

Next, when the first top panel 14a is raised shown in FIG. 13, a finger is applied to the finger-hold point 14c and the first top panel 14a is upwardly pulled. By doing the above, the first triangular side panel 15a that is connected to the first top panel 14a (and the second triangular side panel 15b) is also pulled up. As a result, the second top panel 14b on the opposite side is also gradually raised. It is preferable that the second top panel 14b on the opposite side is also completely raised only by pulling up the first top panel 14a. In this time, as shown in FIGS. 13, 14 and 16, the support pin 13b moves smoothly to the front side (the opposite side of the housing member (recess) 13; a deep side) of the support groove 13c.

Figure 20:
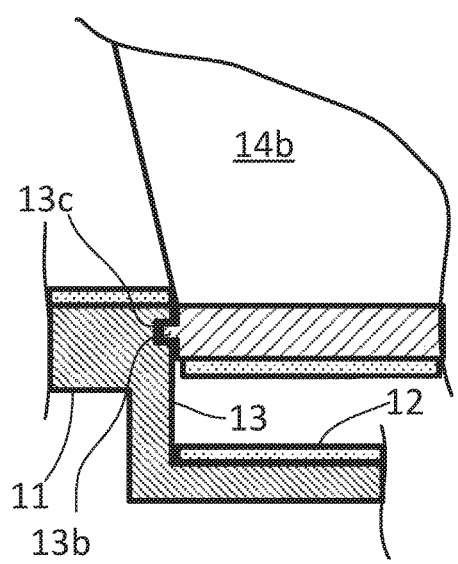
FIG. 20 is a cross section view that shows the raised state along the XX-XX line shown in FIG. 17.
Figure 21:
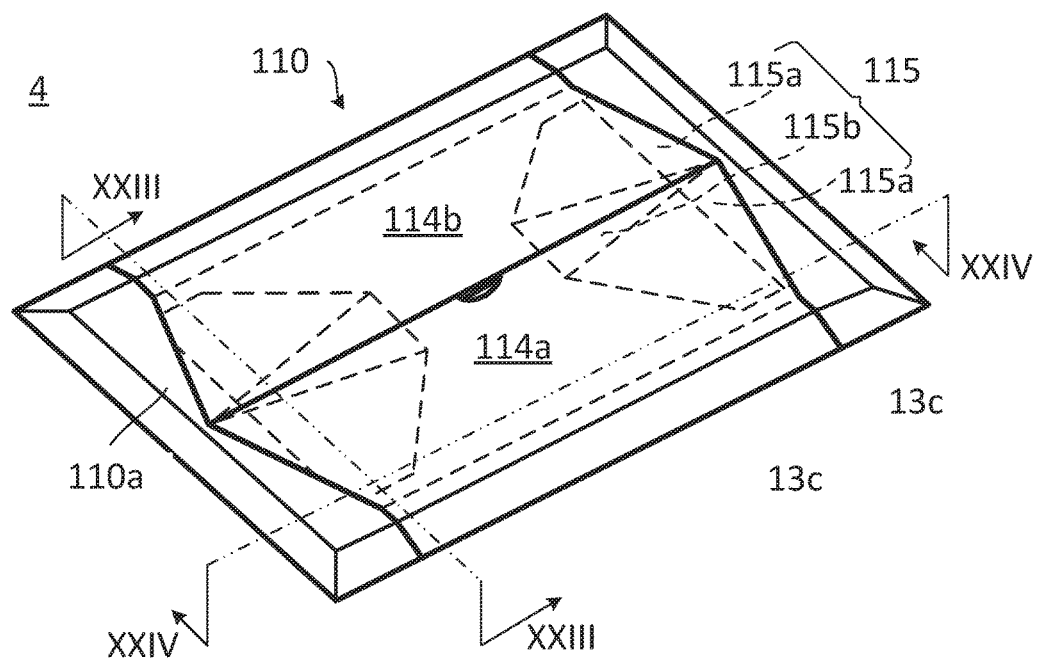
FIG. 21 is an enlarged perspective view that shows a holding device in a folded state according to a second embodiment of the present invention.

As explained above, upon opening the holding device 10 by pulling up the first top panel 14a, the pair of the side panels 15 (and the second triangular side panel 15b) that are connected to the first top panel 14a and the second top panel 14b are also opened (raised) and work together. As a result, the holding device 10 that has the reversed truncated quadrangular pyramid shape is formed. At this time, as shown in FIGS. 18 and 20, the support pin 13b goes back to the vehicle rear side (the side of the housing member (recess) 13) of the support groove 13c. Further, the support pin 13b does not always need to go back to the vehicle rear side of the support groove 13c when being raised explained in the present embodiment. However, when the support pin 13b goes back to the vehicle rear side of the support groove 13c, the appearance of the carpet material 12 is much improved. Further, the container-shaped state can be easily maintained by the weight of the pair of the side panels 15 and the top panels 14 themselves, and when the luggage is stored, even when the luggage is moved therein, the pair of side panels 15 and the top panels 14 hardly fall down. Therefore, the holding device 10 readily becomes the container shaped, and at the same time, the container-shaped state is maintained.

In reverse (closing/housing/folding), as the arrows show in FIG. 4, when the holding device 10 is folded (housed), it is preferred that the pair of the side panels 15 are inwardly pushed at the same time. On the other hand, even when an unintended force is applied to only one of the side panels 15, it is difficult to be closed. The pair of the side panels 15 are made with the rigid material, not the conventional flexible material. Therefore, even when a force is applied to them from the luggage or goods that are stored, it is difficult to close the holding device 10. In addition, even when the weight of such as the luggage or goods are applied from above, it is difficult to close the holding device 10 as compared with a case in which the flexible material is used.

Therefore, in regards to the floorboard 4 having the foldable holding device 10 according to the present embodiment, the holding device 10 can be readily raised to become the container-shaped state, and at the same time, the container-shaped state can also be certainly maintained.

In addition, the operation is extremely simple, and it can be made so that it can be opened by one-step operation with one hand, and at the same time, the open position can be maintained.

Second Embodiment

FIGS. 21-26 show a holding device 110 according to a second embodiment of the present invention, which is different from the first embodiment discussed above. Specifically, the holding device 110 is attachable to and detachable from the floorboard 4. Further, in the present embodiment, the redundant explanations with respect to the same components shown in FIGS. 1-20 are omitted, but the same reference numbers are used for labeling.

Figure 23:
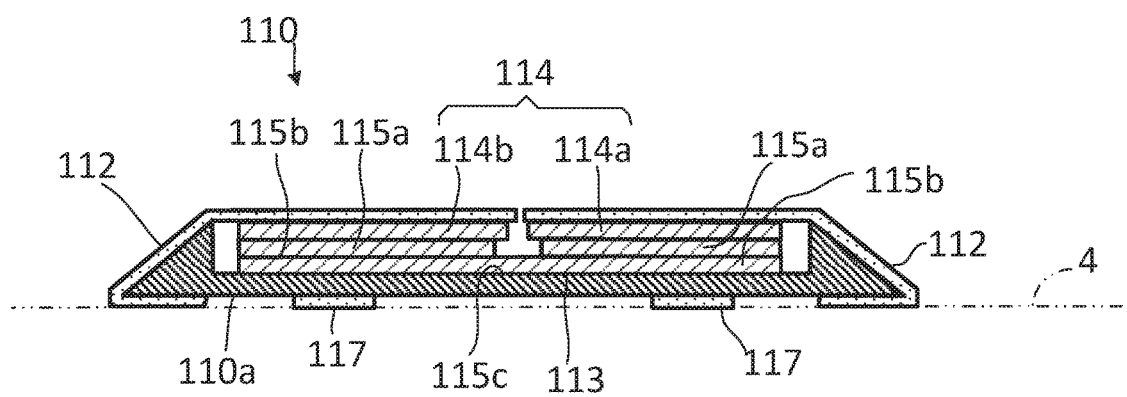
FIG. 23 is a cross section view that shows the folded state along the XXIII-XXIII line shown in FIG. 21.
Figure 24:
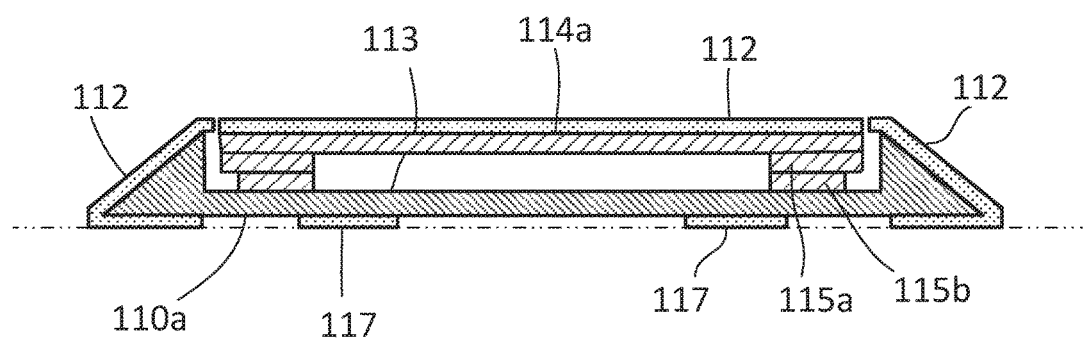
FIG. 24 is a cross section view that shows the folded state along the XXIV-XXIV line shown in FIG. 21.

As shown in FIGS. 23 and 24, a holding device body 110a that is configured with a core material 11 of the holding device 110 is configured to be attachable to and detachable from a surface of the floorboard 4 by a touch fastener (hook and loop fastener) 117 that is provided on a bottom surface the holding device 110. For example, the hooks are provided on the bottom surface the holding device 110 and the loops are provided at the surface of the floorboard 4 (carpet). In other words, because the holding device 110 as an aftermarket product can be attached in a luggage compartment 1 of such as vehicles, it is convenient.

In the same manner as the first embodiment explained above, a top panel 114 is configured with a pair of top panels 114a and 114b. Further, a side panel 115 is configured with a pair of first triangular side panels 115a and a second triangular side panel 115b. The pair of the top panels 114a and 114b is covered with a flexible fabric component 112. The fabric component 112 can be made by the same material as a carpet material 12 and can also be made by other materials. However, when the fabric component 112 has the same material and same color as the carpet material 12, it presents an attractive appearance.

Figure 22:
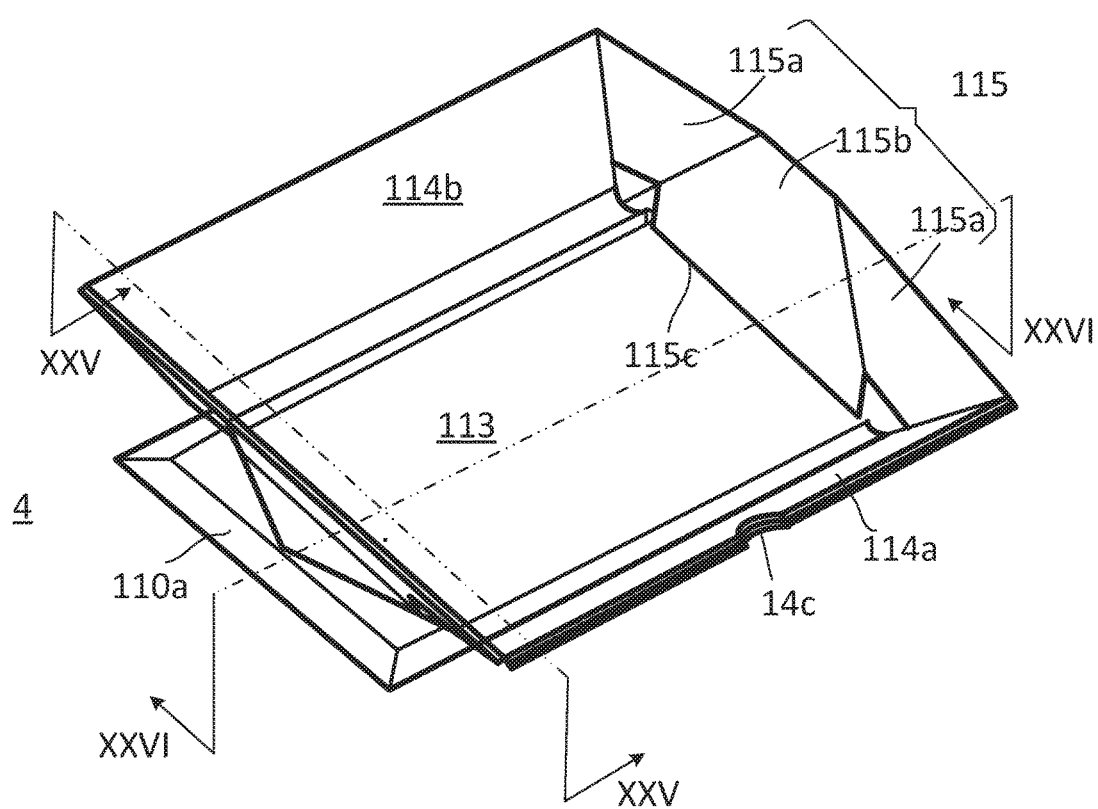
FIG. 22 is an enlarged perspective view that shows the holding device in a raised state according to the second embodiment of the present invention.
Figure 25:
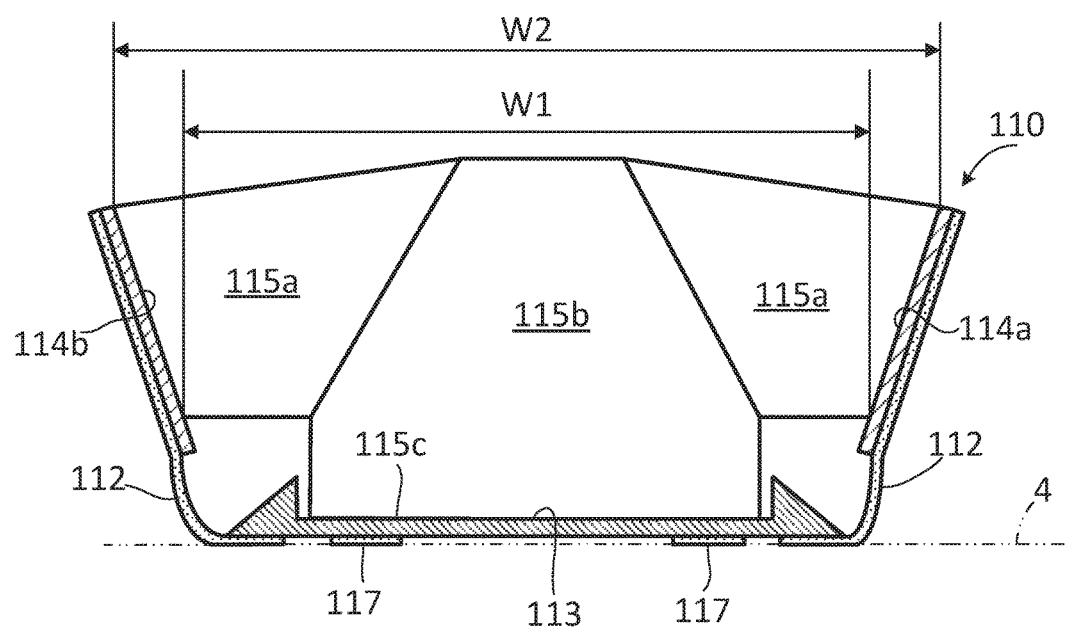
FIG. 25 is a cross section view that shows the raised state along the XXV-XXV line shown in FIG. 22.
Figure 26:
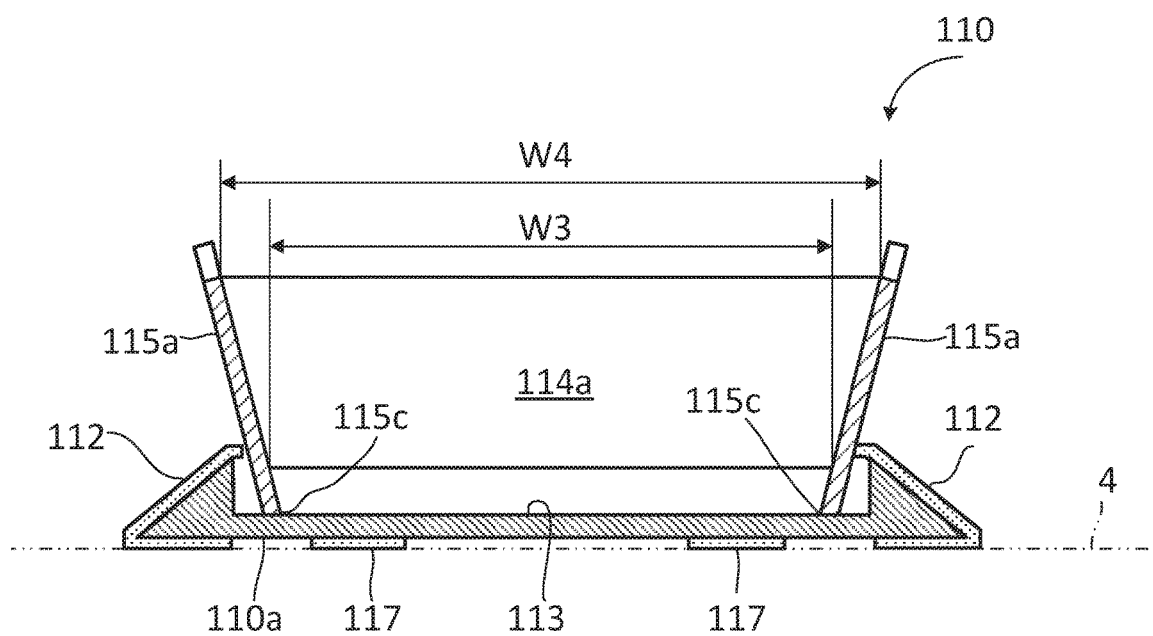
FIG. 26 is a cross section view that shows the raised state along the XXVI-XXVI line shown in FIG. 22.
Figure 27:
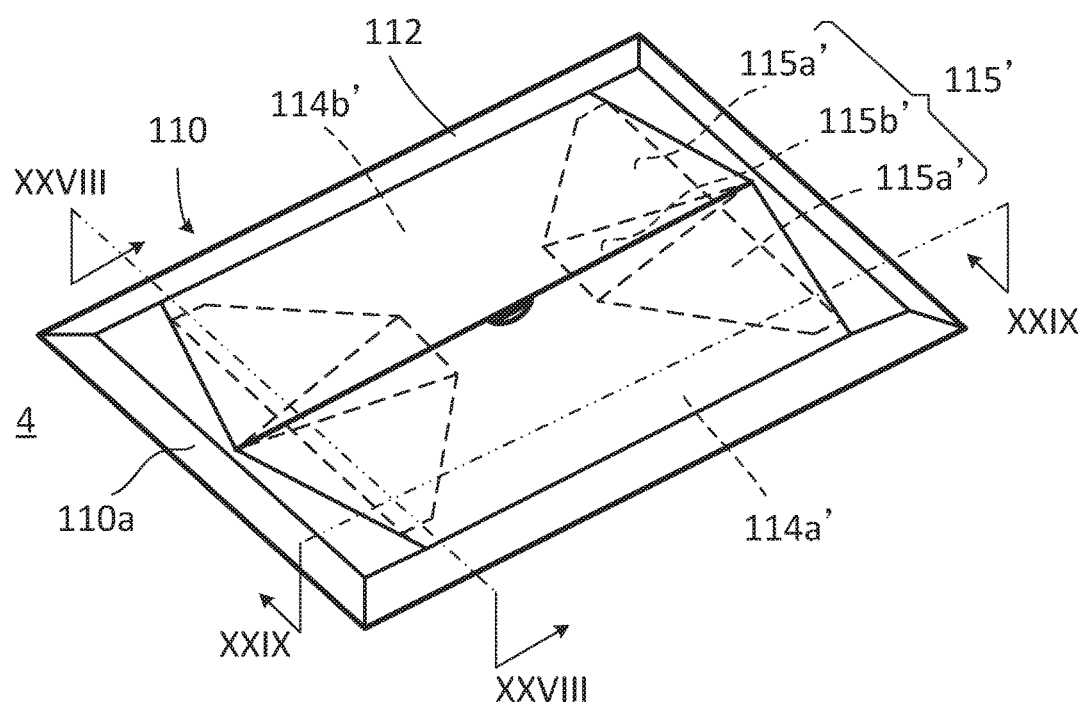
FIG. 27 is an enlarged perspective view that shows a holding device in a folded state according to a variation of the second embodiment of the present invention.
Figure 28:
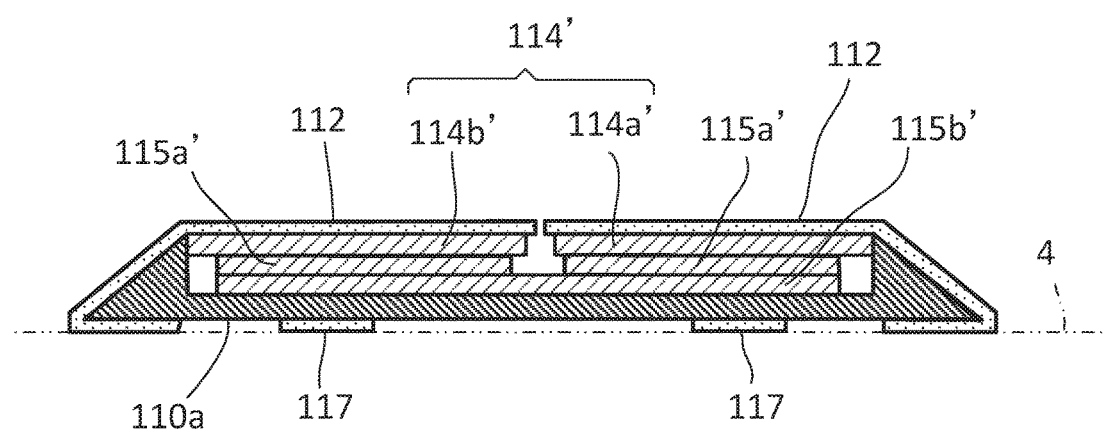
FIG. 28 is a cross section view that shows the folded state along the XXVIII-XXVIII line shown in FIG. 27.
Figure 29:
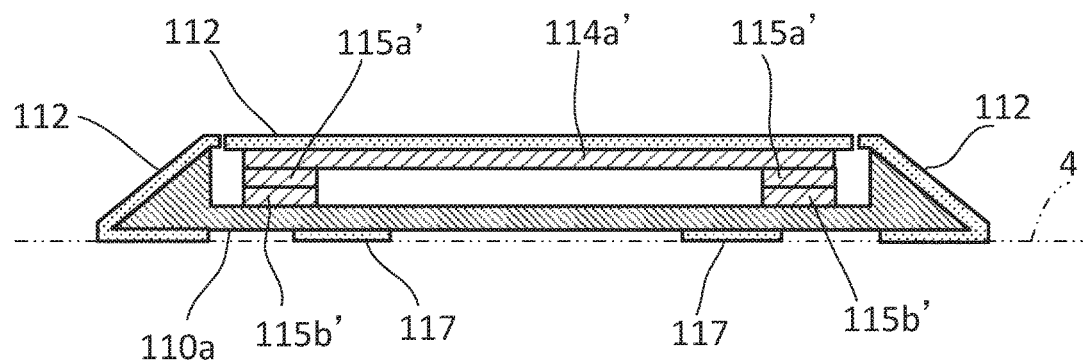
FIG. 29 is a cross section view that shows the folded state along the XXIX-XXIX line shown in FIG. 27.

As shown in FIGS. 22, 25, and 26, in the present embodiment, two of the second triangular side panels 115b are respectively connected (hinge-connected) to a housing member (recess) 113 by a hinge unit 115c. The pair of the top panels 114a and 114b is not hinge-connected to the housing member (recess) 113, and is movably supported via the side panels 115. The hinge unit 115c can be hinge-connected to the core material 11 of the housing member (recess) 113 as a thin layer hinge, or can also be connected by the fabric component 112. When the pair of the top panels 114a and 114b is connected to the housing member (recess) 113 by the fabric component 112, the luggage does not pop out (come out) from the holding device 110 (the housing member (recess) 113) and the raised state of the holding device 110 is stably maintained.

Also in the present embodiment, as shown in FIG. 25, a width W2 of the upper edge is longer than a width W1 of the lower edge of the pair of the side panels 115 in the raised position (W2>W1). Further, as shown in FIG. 26, a width W4 of the upper edge is longer than a width W3 of the lower edge of the first top panel 114a and the second top panel 114b in the raised position (W4>W3). As a result, the holding device 110 is in a reversed truncated quadrangular pyramid shape in the raised position. In other words, as shown in FIGS. 22, 25 and 26, a top area of the reversed truncated quadrangular pyramid shape in the open state formed by the upper edges of the raisable pair of top panels 114 and upper edges of the pair of side panels 115 is larger than a bottom area of the reversed truncated quadrangular pyramid shape in the open state formed by the lower edges of the raisable pair of top panels 114 and lower edges of the pair of side panels 115. Further, the raisable pair of top panels 114 and the pair of side panels 115 are outwardly inclined in the open state in a plan view.

Therefore, also in regards to the foldable holding device 110 according to the present embodiment, not only the holding device 110 can be readily raised to become the container-shaped state, and at the same time, the container-shaped state can also be certainly maintained, but also the holding device 110 can be attached to an arbitrary place on the floorboard 4 when needed. Therefore, it is convenient.

Variations of Second Embodiment

FIGS. 27-32 show a holding device 110' according to a variation of the second embodiment of the present invention, which is different from the second embodiment discussed above. Specifically, the hinge connected positions with respect to the housing member (recess) 113 of the holding device 110' are different.

Figure 30:
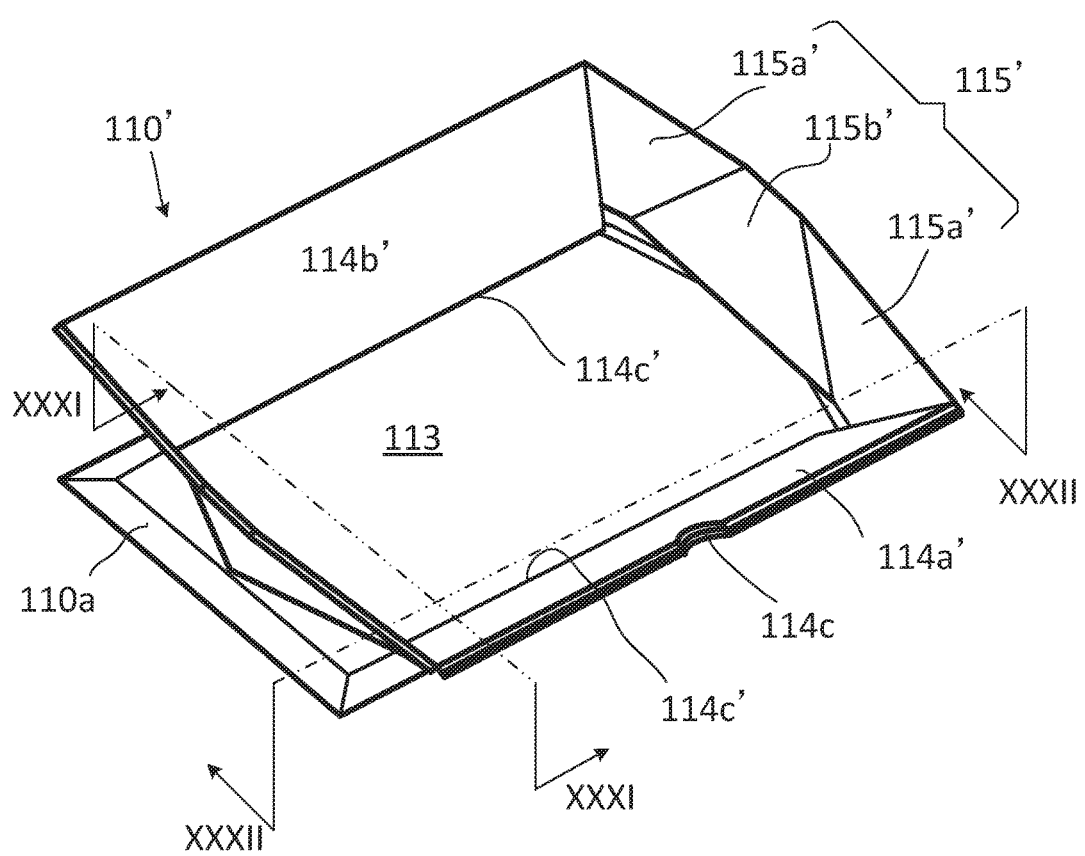
FIG. 30 is an enlarged perspective view that shows the holding device in a raised state according to the variation of the second embodiment of the present invention.
Figure 31:
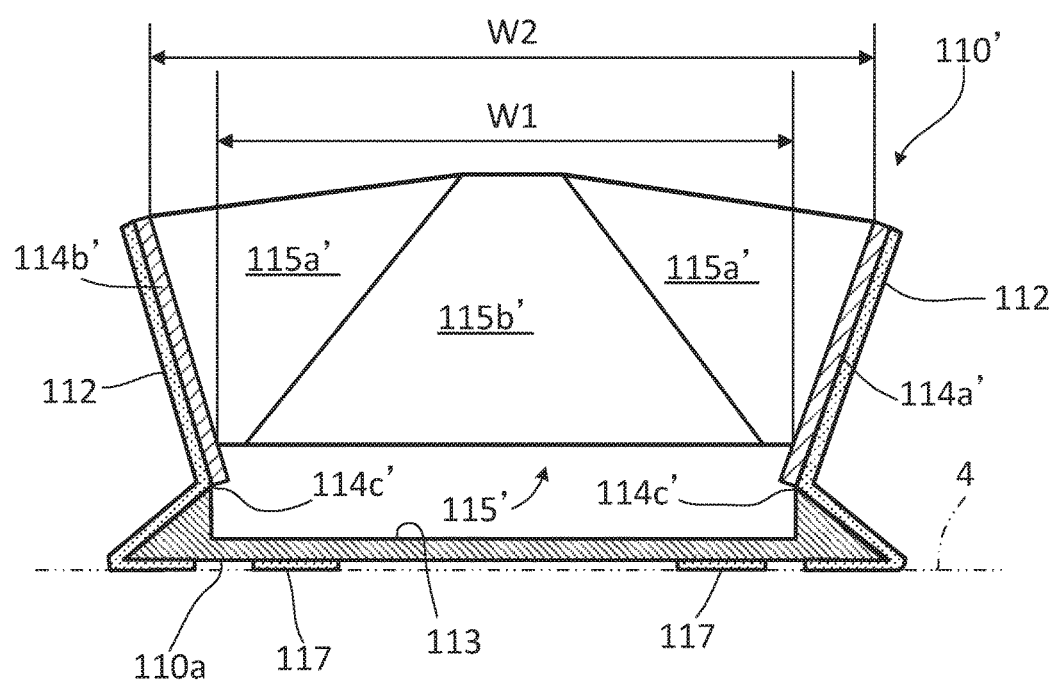
FIG. 31 is a cross section view that shows the raised state along the XXXI-XXXI line shown in FIG. 30.
Figure 32:
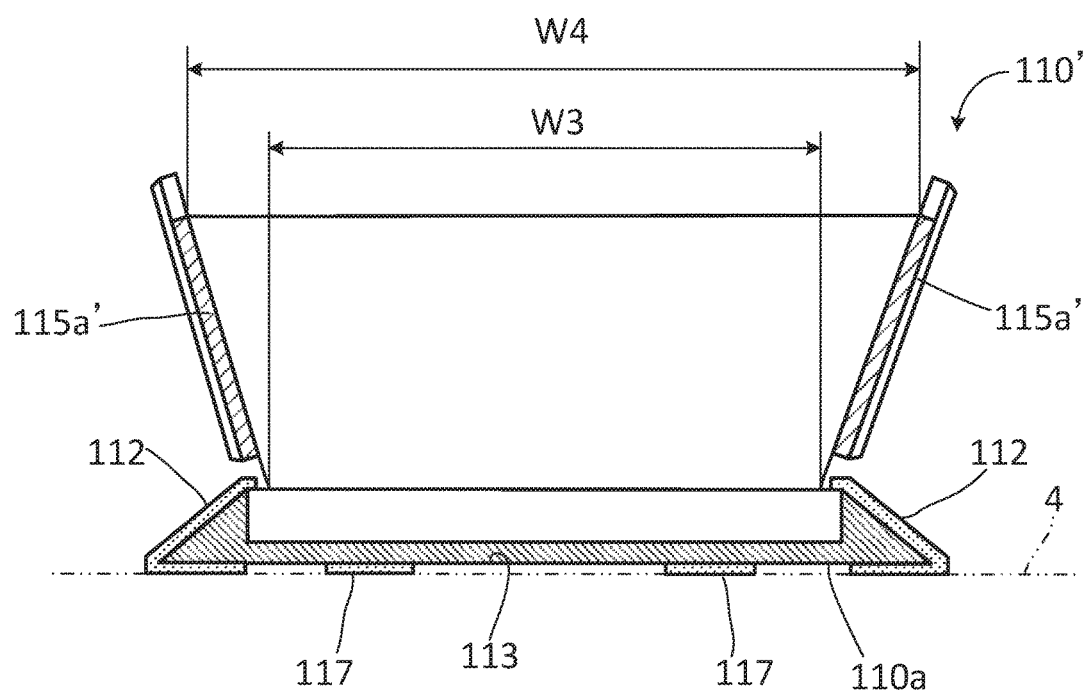
FIG. 32 is a cross section view that shows the raised state along the XXXII-XXXII line shown in FIG. 30.

Also in the present variation embodiment, in the same manner as the first embodiment explained above, a top panel 114' is configured with a pair of top panels 114a' and 114b', and a side panel 115' is configured with a pair of first triangular side panels 115a' and a second triangular side panel 115b'. As shown in FIGS. 30-32, in the present variation embodiment, the pair (two) of the second triangular side panels 115b are not hinge-connected to the housing member (recess) 113. Instead, the pair of the top panels 114a' and 114b' is respectively connected to the housing member (recess) 113 by a hinge unit 114c'. The hinge unit 114c' can also be hinge-connected to a core material 11 of the housing member (recess) 113 as a thin layer hinge.

Also in the present variation embodiment, as shown in FIG. 31, a width W2 of the upper edge is longer than a width W1 of the lower edge of the pair of the side panels 115' in the raised position (W2>W1). Further, as shown in FIG. 32, a width W4 of the upper edge is longer than a width W3 of the lower edge of the first top panel 114a' and the second top panel 114b' in the raised position (W4>W3). As a result, the holding device 110' is in a reversed truncated quadrangular pyramid shape in the raised position. In other words, as shown in FIGS. 30, 31 and 32, a top area of the reversed truncated quadrangular pyramid shape in the open state formed by the upper edges of the raisable pair of top panels 114' and upper edges of the pair of side panels 115' is larger than a bottom area of the reversed truncated quadrangular pyramid shape in the open state formed by the lower edges of the raisable pair of top panels 114' and lower edges of the pair of side panels 115'. Further, the raisable pair of top panels 114' and the pair of side panels 115' are outwardly inclined in the open state in a plan view.

Although a detailed illustration is omitted from the drawings, in regards to the fabric component 112, it is also possible that when a slot is provided in a direction for preventing the fabric component 112 from being bent by being pulled, the opening and closing operations of the top panel 114' can be performed smoothly.

Therefore, also in the present variation embodiment, in the same manner as the second embodiment explained above, because the holding device 110' can be attached on anywhere of the floorboard 4 as an aftermarket product, it is convenient.

Other Variations

A configuration explained below can also be adopted according to the embodiments explained above of the present invention.

In other words, in the embodiments explained above, the upper edge is longer than the lower edge at both of the top panel and the side panel (both W2>W1 and W4>W3). However, even when the upper edge of only either the top panel or the side panel is longer than the lower edge (either W2>W1 or W4>W3), the same effect can be obtained. However, the greater effect of the present embodiment can be obtained when the upper edge is longer than the lower edge at both of the top panels and the side panels.

Further, in the embodiments explained above, the hinge unit 16 is formed by a thin layer of the core material 11 as a thin layer hinge. When the hinge unit 16 is formed by the thin layer of the core material as the thin layer hinge (this is applied to all of the hinge units), there is a benefit that at least a part of the top panel and the side panel can be integrally molded. Further, the hinge unit 16 can also be formed of the carpet material 12 or the flexible fabric components. The configuration of the hinge unit 16 is not limited to these examples, but also may be implemented with a flexible material such as a tape, such as an adhesive tape. There is no particular limitation on the fabric components, but it is preferred that they are made of such as a flexible and durable sheet plastic (resin). It is sufficient that at least left and right outer side surfaces of areas in which two parts are mutually connected are covered by the fabric components.

Further, although an illustration is omitted from the drawings, an opposite surface of the carpet material 12, which is provided at a connection part between the side (wall) of the housing member (recess) and one of the first top panel and the second top panel, can also be connected by an auxiliary fabric component.

The foldable holding device being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A foldable holding device provided in a floorboard of a luggage compartment, the foldable holding device comprising:
    a housing member that is provided at the floorboard;
    a raisable pair of top panels that nests within the housing member in a housed state, each of the raisable pair of top panels having an upper edge, a lower edge and side edges, the raisable pair of top panels stand when the raisable pair of top panels are outwardly opened from the upper edges of the raisable pair of top panels; and
    a pair of side panels foldably connected to the side edges of each of the raisable pair top panels, the pair of side panels being configured to outwardly move as the raisable pair of top panels are raised and to form, together with the raisable pair of top panels, an open state of the foldable holding device in a reversed truncated quadrangular pyramid shape,
    wherein a length of the upper edge of each of the raisable pair of top panels is longer than a length of the lower edge of each of the raisable pair of top panels,
    wherein the foldable holding device is fixed to the floorboard so that the foldable holding device and floorboard configure a single member,
    wherein the housing member is configured by a recess, and a bottom surface of the recess is located below the floorboard, and
    one of the lower edges of the raisable pair of top panels is hinge-connected to the housing member, and the other of the lower edges of the raisable pair of top panels is movable when the raisable pair of top panels are outwardly opened and inwardly closed.

2. The foldable holding device according to claim 1, wherein a length of an upper edge of each of the pair of side panels is longer than a length of a lower edge of each of the pair of side panels.

3. The foldable holding device according to claim 1, wherein each of the pair of side panels is configured with:
    a first pair of triangular side panels that are generally triangularly or trapezoidally shaped, a first side edge of each of the first pair of triangular side panels being foldably connected to one of the side edges of each of the raisable pair of top panels, respectively; and
    a second triangular side panel that is generally triangularly or trapezoidally shaped, and two side edges of the second triangular side panel being respectively and foldably connected to two of second side edges of the first pair of triangular side panels.

4. The foldable holding device according to claim 3, wherein mating faces between the two side edges of the second triangular side panel and the second side edges of the first pair of triangular side panels have a chamfer.

5. The foldable holding device according to claim 4, wherein the chamfer is provided closer to the upper edge of the second triangular side panel than the lower edge of the second triangular side panel.

6. The foldable holding device according to claim 1, wherein
a support projection is provided at the other of the lower edges of the raisable pair of top panels so that the other of the lower edges of the raisable pair of top panels is rotatably and slidably supported by inserting the support projection into the guide groove.

7. The foldable holding device according to claim 1, further comprising:
a plurality of legs that are provided in a side of the housing member,
wherein the other of the lower edges of the raisable pair of top panels has a plurality of legs that are continuously and outwardly formed from the other of the lower edges of the raisable pair of top panels, and
a gap between the side of the housing member and the other of the lower edges of the raisable pair of top panels is in a zigzag shape.

8. A foldable holding device provided in a floorboard of a luggage compartment, the foldable holding device comprising:
a housing member that is provided at the floorboard;
a raisable pair of top panels that nests within the housing member in a housed state, each of the raisable pair of top panels having an upper edge, a lower edge and side edges, the raisable pair of top panels stand when the raisable pair of top panels are outwardly opened from the upper edges of the raisable pair of top panels; and
a pair of side panels foldably connected to the side edges of each of the raisable pair top panels, the pair of side panels being configured to outwardly move as the raisable pair of top panels are raised and to form, together with the raisable pair of top panels, an open state of the foldable holding device in a reversed truncated quadrangular pyramid shape,
wherein a length of an upper edge of each of the pair of side panels is longer than a length an lower edge of each of the pair of side panels,
wherein the foldable holding device is fixed to the floorboard so that the foldable holding device and floorboard configure a single member,
wherein the housing member is configured by a recess, and a bottom surface of the recess is located below the floorboard, and
one of the lower edges of the raisable pair of top panels is hinge-connected to the housing member, and the other of the lower edges of the raisable pair of top panels is movable when the raisable pair of top panels are outwardly opened and inwardly closed.

9. The foldable holding device according to claim 8, wherein the house member has a guide groove, and
a support projection is provided at the other of the lower edges of the raisable pair of top panels so that the other of the lower edges of the raisable pair of top panels is rotatably and slidably supported by inserting the support projection into the guide groove.

10. The foldable holding device according to claim 8, further comprising:
a plurality of legs that are provided in a side of the housing member,
wherein the other of the lower edges of the raisable pair of top panels has a plurality of legs that are continuously and outwardly formed from the other of the lower edges of the raisable pair of top panels, and
a gap between the side of the housing member and the other of the lower edges of the raisable pair of top panels is in a zigzag shape.

11. The foldable holding device according to claim 8, wherein each of the pair of side panels is configured with:
a first pair of triangular side panels that are generally triangularly or trapezoidally shaped, a first side edge of each of the first pair of triangular side panels being foldably connected to one of the side edges of each of the raisable pair of top panels, respectively; and
a second triangular side panel that is generally triangularly or trapezoidally shaped, and two side edges of the second triangular side panel being respectively and foldably connected to two of second side edges of the first pair of triangular side panels.

12. The foldable holding device according to claim 11, wherein mating faces between the two side edges of the second triangular side panel and the second side edges of the first pair of triangular side panels have a chamfer.

13. The foldable holding device according to claim 12, wherein the chamfer is provided closer to the upper edge of the second triangular side panel than the lower edge of the second triangular side panel.

14. A foldable holding device provided on a floorboard of a luggage compartment, the foldable holding device comprising:
a housing member that is provided on the floorboard;
a raisable pair of top panels that nests within the housing member in a housed state, each of the raisable pair of top panels having an upper edge, a lower edge and side edges, the raisable pair of top panels stand when the raisable pair of top panels are outwardly opened from the upper edges of the raisable pair of top panels; and
a pair of side panels foldably connected to the side edges of each of the raisable pair top panels, the pair of side panels being configured to outwardly move as the raisable pair of top panels are raised and to form, together with the raisable pair of top panels, an open state of the foldable holding device in a reversed truncated quadrangular pyramid shape,
wherein a top area of the reversed truncated quadrangular pyramid shape in the open state formed by the upper edges of the raisable pair of top panels and upper edges of the pair of side panels is larger than a bottom area of the reversed truncated quadrangular pyramid shape in the open state formed by the lower edges of the raisable pair of top panels and lower edges of the pair of side panels, and
wherein when the raisable pair of top panels and the pair of side panels are housed in the housing member in the housed state, the foldable holding device is in a truncated quadrangular pyramid shape.

15. The foldable holding device according to claim 14, wherein a bottom of the housing member is detachable to the floorboard via a hook and loop fastener.

16. The foldable holding device according to claim 14, wherein the foldable holding device is detachable to the floorboard,
wherein the lower edges of the raisable pair of top panels are hinge-connected to the housing member.

17. The foldable holding device according to claim 14, wherein each of the pair of side panels is configured with:
a first pair of triangular side panels that are generally triangularly or trapezoidally shaped, a first side edge of each of the first pair of triangular side panels being foldably connected to one of the side edges of each of the raisable pair of top panels, respectively; and
a second triangular side panel that is generally triangularly or trapezoidally shaped, and two side edges of the second triangular side panel being respectively and foldably connected to two of second side edges of the first pair of triangular side panels.

18. The foldable holding device according to claim 17, wherein the foldable holding device is detachable to the floorboard,
wherein the lower edge of the second triangular side panel is hinge-connected to the housing member, and
the lower edges of the raisable pair of top panels are movably connected to the housing member.

19. The foldable holding device according to claim 17, wherein mating faces between the two side edges of the second triangular side panel and the second side edges of the first pair of triangular side panels have a chamfer.

20. The foldable holding device according to claim 19, wherein the chamfer is provided closer to the upper edge of the second triangular side panel than the lower edge of the second triangular side panel.

21. A foldable holding device provided on a floorboard of a luggage compartment, the foldable holding device comprising:
a housing member that is provided on the floorboard;
a raisable pair of top panels that nests within the housing member in a housed state, each of the raisable pair of top panels having an upper edge, a lower edge and side edges, the raisable pair of top panels stand when the raisable pair of top panels are outwardly opened from the upper edges of the raisable pair of top panels; and
a pair of side panels foldably connected to the side edges of each of the raisable pair top panels, the pair of side panels being configured to outwardly move as the raisable pair of top panels are raised and to form, together with the raisable pair of top panels, an open state of the foldable holding device in a reversed truncated quadrangular pyramid shape,
wherein the raisable pair of top panels and the pair of side panels are outwardly inclined in the open state in a plan view, and
wherein when the raisable pair of top panels and the pair of side panels are housed in the housing member in the housed state, the foldable holding device is in a truncated quadrangular pyramid shape.

22. The foldable holding device according to claim 21, wherein a bottom of the housing member is detachable to the floorboard via a hook and loop fastener.

23. The foldable holding device according to claim 21, wherein the foldable holding device is detachable to the floorboard,
wherein the lower edges of the raisable pair of top panels are hinge-connected to the housing member.

24. The foldable holding device according to claim 21, wherein each of the pair of side panels is configured with:
a first pair of triangular side panels that are generally triangularly or trapezoidally shaped, a first side edge of each of the first pair of triangular side panels being foldably connected to one of the side edges of each of the raisable pair of top panels, respectively; and
a second triangular side panel that is generally triangularly or trapezoidally shaped, and two side edges of the second triangular side panel being respectively and foldably connected to two of second side edges of the first pair of triangular side panels.

25. The foldable holding device according to claim 24, wherein the foldable holding device is detachable to the floorboard,
wherein the lower edge of the second triangular side panel is hinge-connected to the housing member, and
the lower edges of the raisable pair of top panels are movably connected to the housing member.

26. The foldable holding device according to claim 24, wherein mating faces between the two side edges of the second triangular side panel and the second side edges of the first pair of triangular side panels have a chamfer.

27. The foldable holding device according to claim 26, wherein the chamfer is provided closer to the upper edge of the second triangular side panel than the lower edge of the second triangular side panel.

28. A foldable holding device provided on a floorboard of a luggage compartment, the foldable holding device comprising:
a housing member that is detachably provided on the floorboard;
a raisable pair of top panels that nests within the housing member in a housed state, each of the raisable pair of top panels having an upper edge, a lower edge and side edges, the raisable pair of top panels stand when the raisable pair of top panels are outwardly opened from the upper edges of the raisable pair of top panels; and
a pair of side panels foldably connected to the side edges of each of the raisable pair top panels, the pair of side panels being configured to outwardly move as the raisable pair of top panels are raised and to form, together with the raisable pair of top panels, an open state of the foldable holding device in a reversed truncated quadrangular pyramid shape,
wherein a length of the upper edge of each of the raisable pair of top panels is longer than a length of the lower edge of each of the raisable pair of top panels, and
wherein a fabric sheet is on the raisable pair of top panels and continuously extends onto a bottom surface of the housing member.

29. A foldable holding device provided on a floorboard of a luggage compartment, the foldable holding device comprising:
a housing member that is detachably provided on the floorboard;
a raisable pair of top panels that nests within the housing member in a housed state, each of the raisable pair of top panels having an upper edge, a lower edge and side edges, the raisable pair of top panels stand when the raisable pair of top panels are outwardly opened from the upper edges of the raisable pair of top panels; and
a pair of side panels foldably connected to the side edges of each of the raisable pair top panels, the pair of side panels being configured to outwardly move as the raisable pair of top panels are raised and to form, together with the raisable pair of top panels, an open state of the foldable holding device in a reversed truncated quadrangular pyramid shape,
wherein a length of an upper edge of each of the pair of side panels is longer than a length an lower edge of each of the pair of side panels, and wherein a fabric sheet is on the raisable pair of top panels and continuously extends onto a bottom surface of the housing member.

* * * * *